United States Patent [19]

Tamamura et al.

[11] Patent Number: 4,668,061
[45] Date of Patent: May 26, 1987

[54] BUCKLE FOR A WATER-PROOF CAMERA

[75] Inventors: Hideo Tamamura; Hiroshi Maeno, both of Tokyo, Japan

[73] Assignee: Canon Kabushiki Kaisha, Tokyo, Japan

[21] Appl. No.: 770,624

[22] Filed: Aug. 28, 1985

[30] Foreign Application Priority Data

Aug. 31, 1984 [JP] Japan .......................... 59-131480[U]

[51] Int. Cl.$^4$ ............................................ G03B 21/08
[52] U.S. Cl. .................................................. 354/64
[58] Field of Search .................. 354/64, 288; 220/324; 24/68 T, 69 CF, 69 CT, 170, 270

[56] References Cited

U.S. PATENT DOCUMENTS

| 2,945,274 | 7/1960 | Paterson | 24/68 T |
| 4,100,553 | 7/1978 | Danel | 354/64 |
| 4,383,743 | 5/1983 | Nozawa et al. | 354/64 |

FOREIGN PATENT DOCUMENTS 1459995 10/1966 France ........................ 220/324

Primary Examiner—Donald A. Griffin
Attorney, Agent, or Firm—Toren, McGeady and Goldberg

[57] ABSTRACT

A buckle device for a water-proof camera is disclosed, including a buckle arm pivotally mounted at its one end to the camera housing, and a buckle body whose one end is pivotally mounted on the free end of the arm and whose opposite end has a bent-over lug from a pin on the back lid of the camera. The buckle arm has a spring-biased buckle lock member arranged to engage in a recess provided in the camera housing. By slidingly moving the buckle lock member against the bias spring, the buckle arm is released from the connection with the recess. In this releasing position, the buckle lock member then functions as a handle for taking the lug from engagement with the back lid of the camera housing. Therefore, the back lid is surely prevented from opening by accident.

5 Claims, 13 Drawing Figures

BUCKLE FOR A WATER-PROOF CAMERA

BACKGROUND OF THE INVENTION

1. Field of the Invention

This invention relates to a buckle device, and more particularly to a buckle device for a water-proof camera of the type in which a hinge type back lid is opened when a film is loaded and is closed after the film has been loaded.

2. Description of the Prior Art

It is known in the art to provide a technique of locking the back lid of the water-proof camera by a buckle device in Japanese Laid-Open Utility Model application No. SHO 58-98628. In this prior art example, because the lock member and the handle of the buckle take a separate form from each other, there was a problem that if the user overlooks to set the lock member and unintentionally touches the handle under water, the back lid will be caused to open.

Also, even with the lock member set on, because the handle is very easily accessible to the user's finder, when a strong force is carelessly applied thereto, the buckle device will be damaged with an appreciable possibility.

SUMMARY OF THE INVENTION

It is, therefore, an object of the present invention to eliminate the above-described problem of the prior art device, and to provide a buckle device for a water-proof camera which is easy to handle when the back lid of the camera is opened and closed, while still assuring that its locking is not accidentally taken off.

In one embodiment of the invention, the buckle device comprises a body pivotally supported at its one side on an arm which is pivotally mounted on the camera housing and having a bent-over lug at the opposite side thereof and a lock member arranged on the arm to slidingly move by the action of a bias spring to engage a receptor provided in the camera housing. When the lock member is moved against the force of the bias spring to disengage from the receptor, the arm is released from the locking connection with the camera housing. In this releasing position, the lock member turns to a handle for taking the lug out of engagement with the back lid of the camera. The use of such a buckle device provides assuarance that the back lid of the camera is not accidentally opened.

DETAILED DESCRIPTION OF THE PREFERRED EMBODIMENTS

Figure 1:
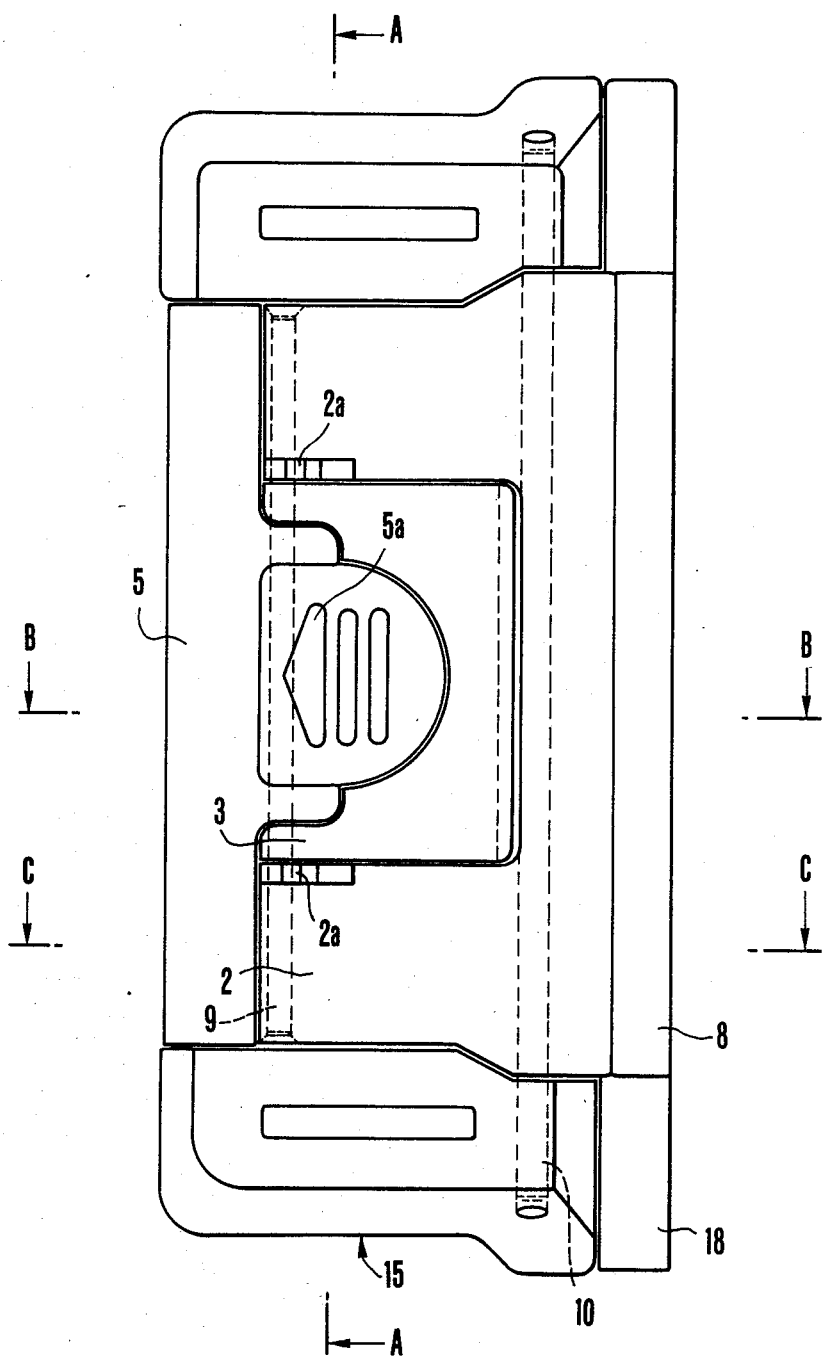
FIG. 1 is a front view of an embodiment of a buckle device for a water-proof camera according to the present invention.
Figure 2:
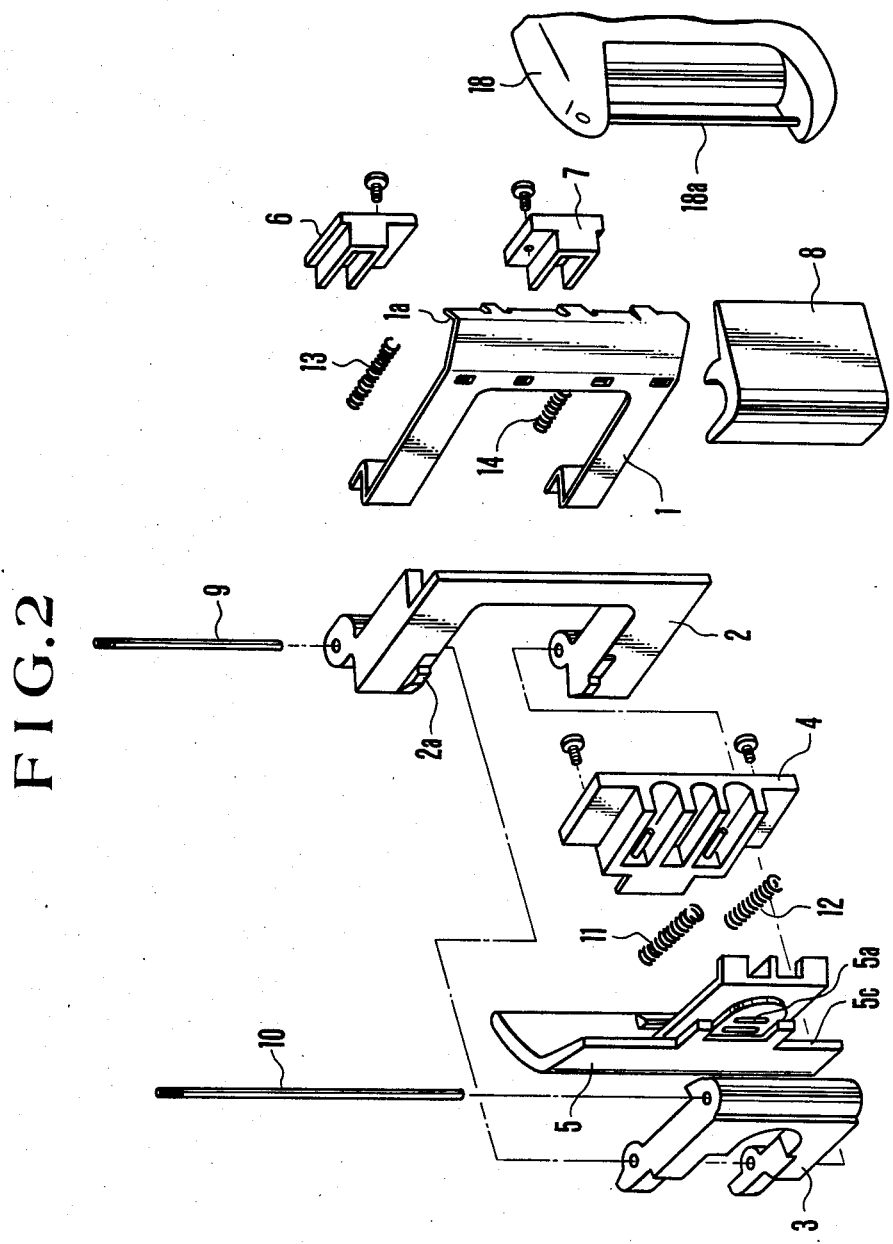
FIG. 2 is an exploded perspective view of the main parts of the buckle device of FIG. 1.
Figure 3:
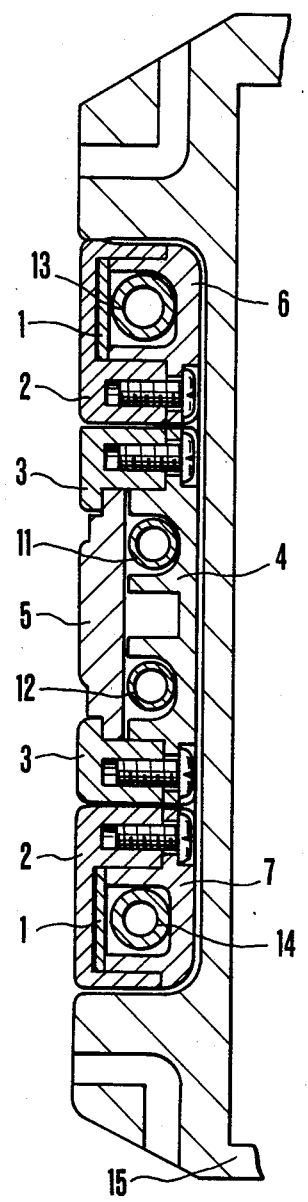
FIG. 3 is a cross-sectional view taken along a line A—A of FIG. 1.
Figure 4:
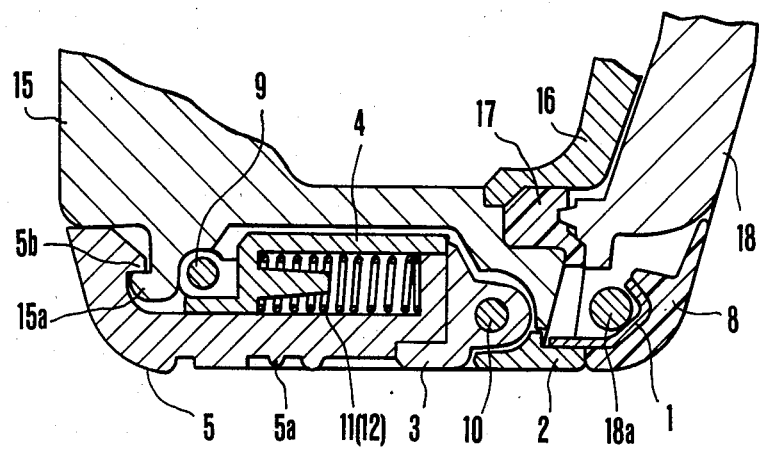
FIG. 4 is a cross-sectional view taken along another line B—B of FIG. 1.

In FIGS. 1 to 11 there is shown one embodiment of the invention where a buckle 1 is held on the inner surface of a buckle body 2 of letter "U" shape pivotally mounted on a shaft 9 which is fixedly secured to the free end of a buckle arm 3 of letter "U" shape about a pivot 10 in one of the rear corners of the camera housing 15. Between the arm 3 and a spring abutment 4 fixedly secured to the arm 3 by screw fasteners there is a buckle lock member 5 having a knurled area 5a in the outer surface thereof slidingly movable along the side panel of the camera housing 15. Springs 11 and 12 in respective spaces between the abutment 4 and the lock member 5 urge a hooked portion 5b of the lock member 5 at the inner front end to engage with a receptor 15a in the front corner of the camera housing 15. In this engaging position, the hooked portion 5b is conformed to the outer shape of the receptor 15a.

The buckle 1 has a bent over lug 1a formed in the free end thereof. The outer surface of the lug 1a is covered by an elastic member 8 and is engageable with a rod 18a in the free end of a back lid 18 of the camera housing 15. The buckle 1 is slidably mounted between the body 2 and a pair of spring abutments 6 and 7 fixedly secured to the body 2 by screw fasteners. Springs 13 and 14 in recesses of the abutments 6 and 7 respectively urge the buckle 1 to pull in the rod 18a of the back lid 18 in engagement with the bent over lug 1a. A pair of protuberances 2a are formed on the outer surface of the body 2 to engage a rear edge 5c of the lock member 5 when the back lid 18 is opened as released from the locking connection with the member 5.

A packing 17 is fixedly secured to the rear wall of the side panels of the camera housing 15 and cooperates with a back cover 16 so that when the back lid 18 is closed, a rib formed on the front wall of the back lid 18 is pressed against the packing 17 to watertightly shield the interior of the camera.

The operation of the buckle device of such construction is as follows. The water-proof camera with its back lid 18 in the locked position by the buckle device first assumes the position illustrated in FIGS. 1, 4, 8 and 11.

Figure 5:
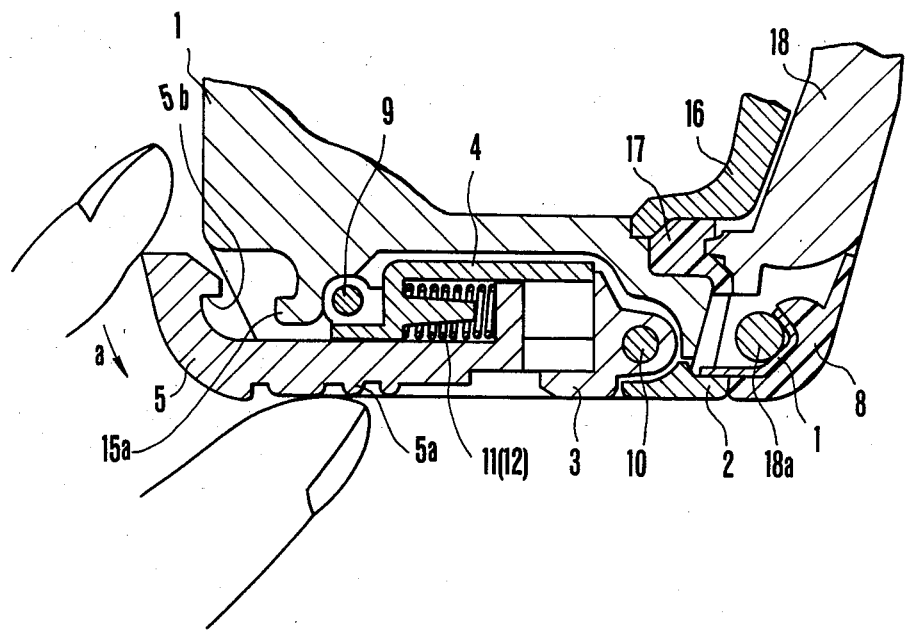
FIGS. 5 to 7 are similar to FIG. 4 except that additional three different operative positions are illustrated.
Figure 6:
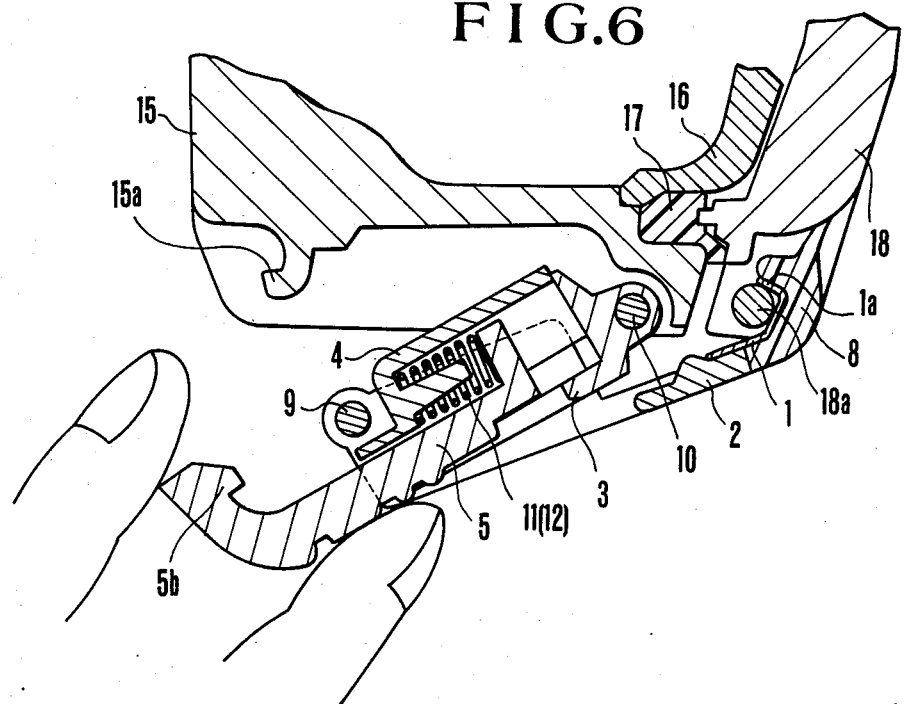
Figure 7:
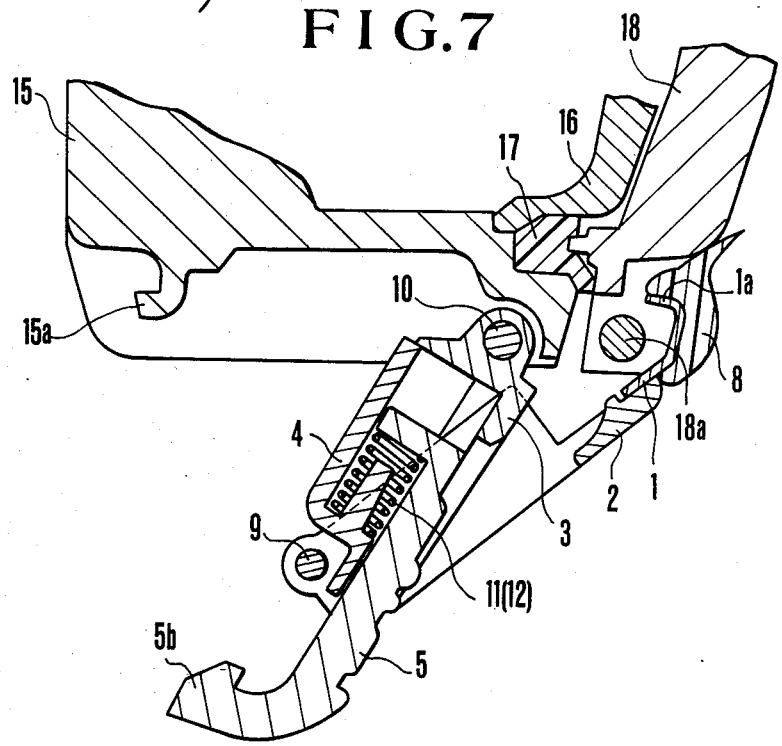
Figure 8:
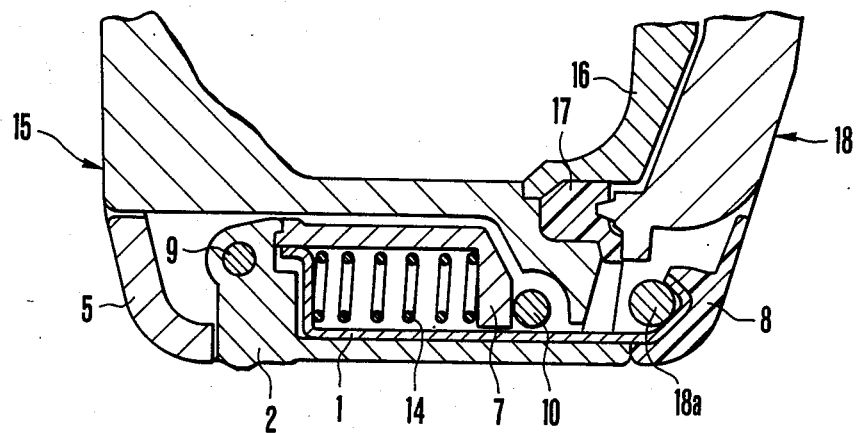
FIG. 8 is a cross-sectional view taken along still another line C—C of FIG. 1.
Figure 9:
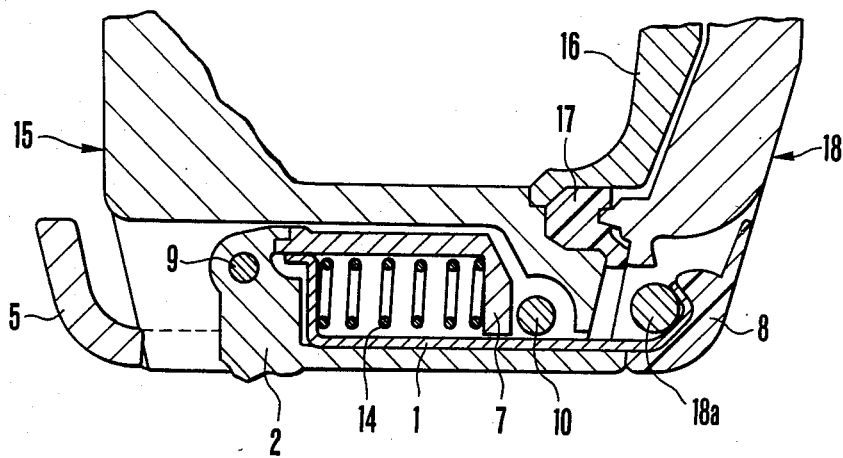
FIGS. 9 and 10 are similar to FIG. 8 where how the lock member operates relative to the buckle body is illustrated.

To load the camera with film, for opening the back lid 18, the operator puts his finger on the knurled area 5a of the lock member 5 and then slides it forward or to the left as viewed in FIGS. 5 and 9 against the bias force of the springs 11 and 12, thereby the hook 5b is disengaged from the receptor 15a. And, it is in this position that the front side edge of the lock member 5 protrudes outwardly of the front panel of the camera housing 15. Then, the operator can put another finger on the back surface of the lock member 5 and move it away from the camera housing with ease. This causes counterclockwise movement of the lock member 5 along with the arm 3 and spring abutment 4 about the shaft 9 as shown in FIG. 6. During this movement, until a certain angle of rotation, the distance between the shaft 9 and the rod 18a is gradually shortening as the angle of rotation of the lock member 5 increases. Therefore, the buckle 1 and body 2 are pushed rearward (to the right) as shown in FIG. 7, thereby the lug 1a is taken out of engagement with the rod 18a. The buckle cover 8, because of its having an elastic property, is also bent as shown in the figure. And, in this completely disengaged position, the back lid 18 can be opened as it turns about its pivot on the camera housing 15.

Figure 10:
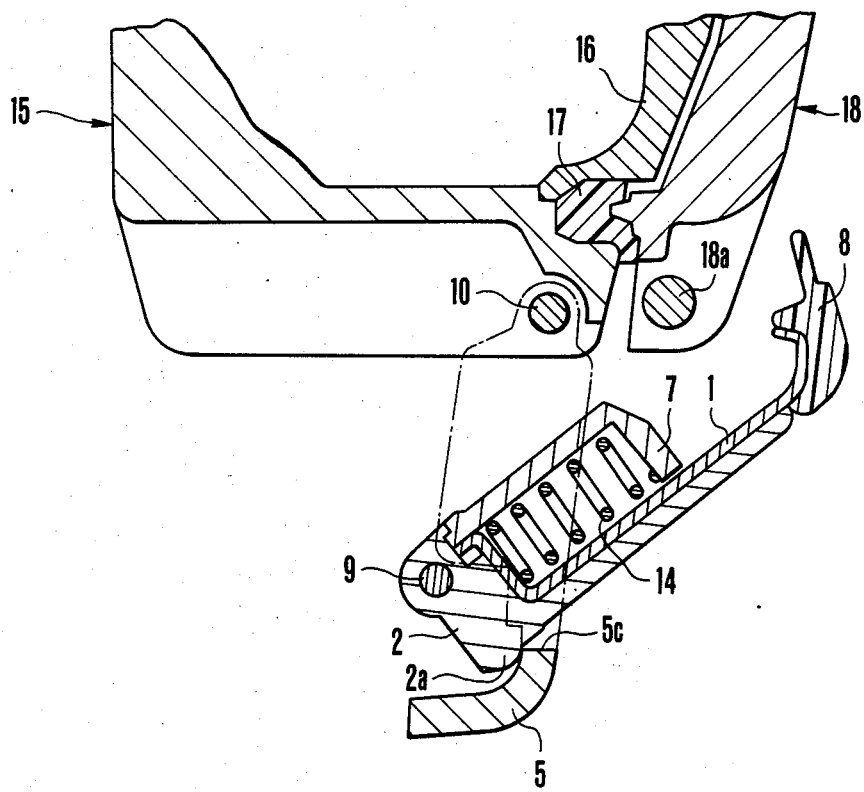

Meanwhile, the lock member 5 in the outwardly turned position tends to slide backward by the action of the bias springs 11 and 12, but, as shown in FIG. 10, its rear side edge 5c is barred by the protuberances 2a. Therefore, when the back lid 18 is released from the locking connection, the buckle body retains itself in the retracted position from the camera housing.

After the film has been loaded, the operator then needs to set the buckle device on the closed back lid 18. To do this, he first brings the lug 1a into engagement with the rod 18a, thereby the protuberances 2a are moved away from the lock member 5 to allow for movement of the body 2 toward the camera housing 15. He then pushes the arm 3 toward the camera housing by his finger. During this time, the tapered surface of the hook 5b slidingly moves along the "R" surface of the receptor 15a while the lock member 5 is once slightly moved forward. The lock member 5 is then moved backward by the action of the springs 11 and 12, thereby the hook 5b is engaged in the receptor 15a. Thus, the buckle device is set on, taking the position of FIGS. 1, 4, 8 and 11.

Figure 12:
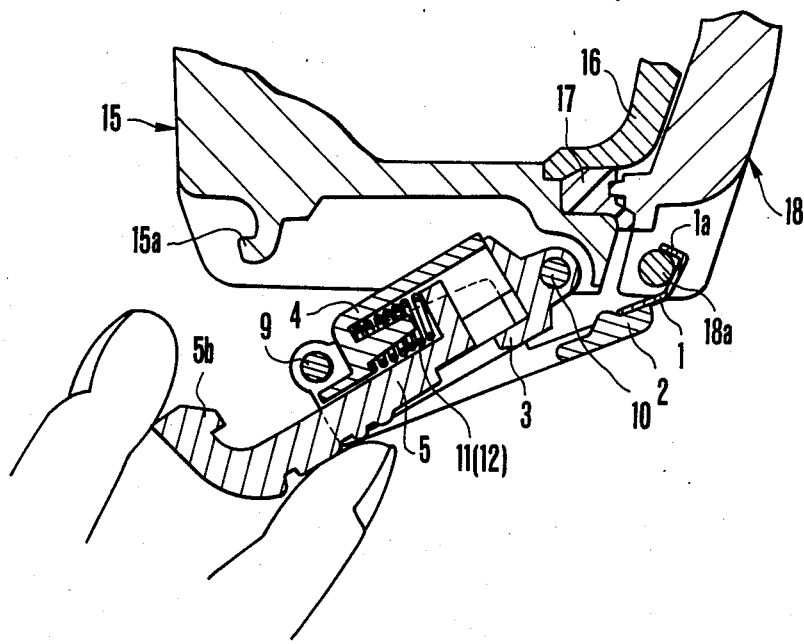
FIGS. 12 and 13 are sectional views of another embodiment of the buckle device according to the present invention in two different operative positions.
Figure 13:
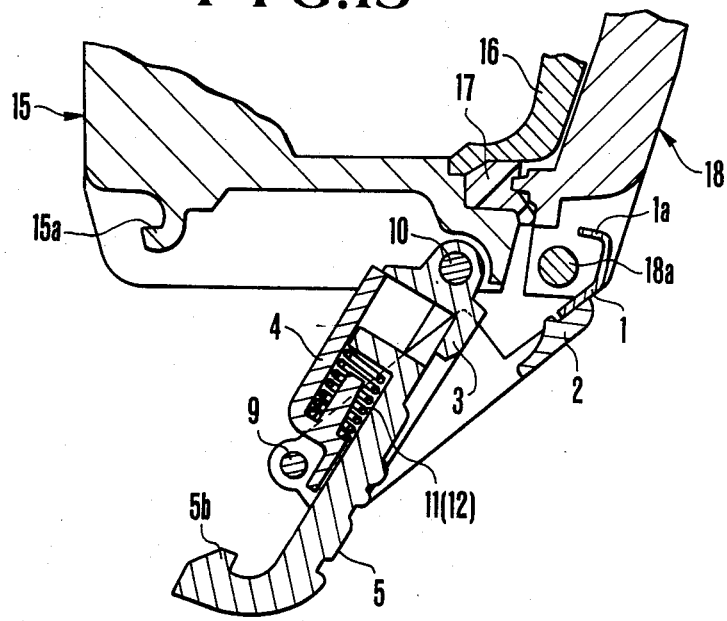

Though, in the first embodiment described above, the buckle 1 is provided with the elastic cover 8, this cover 8 is not necessarily used as shown in a second embodiment of FIGS. 12 and 13.

Figure 11:
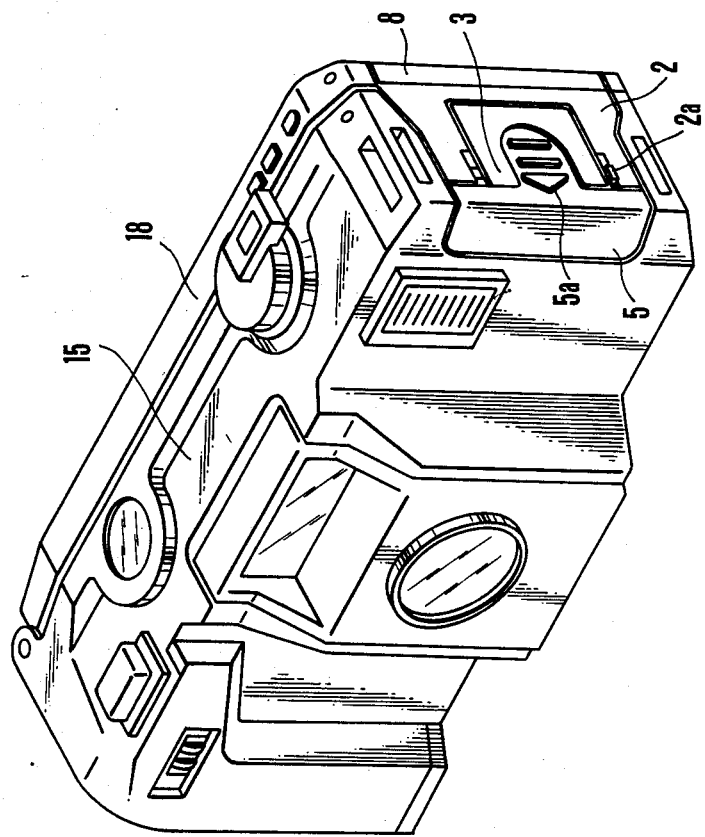
FIG. 11 is a perspective view illustrating the outer appearance of a water-proof camera employing the buckle device of FIGS. 1 to 10.

According to the present invention, as has been described above, when the lock member for the back lid of the camera housing is moved to finish its locking function, it turns to a handle for taking off the buckle out of the back lid. When the buckle device is set on, this handle is snugly received in the side panel of the camera housing as shown in FIG. 11, thereby giving an advantage that when in use, the water-proof camera can be treated in any way without having to take care of accidental opening of the back lid. Another advantage is that one touch of operation suffices for either of the removing and setting of the buckle device when the back lid is to be opened or after it has been closed.

What is claimed is:

1. A buckle device for a water-proof camera, said camera having a lock receiving portion and a back lid, comprising:
   (a) a buckle arm rotatably supported said water-proof camera;
   (b) buckle lock means slidably supported on said buckle arm and arranged to slide betweeen a first position where said means engages with said lock receiving portion and a second position where said means is disengaged from said lock receiving portion as said means slides, one end of said buckle lock means serving as a handle when in said second position; and
   (c) an engagement member rotatably supported on said buckle arm and having a portion engageable with said back lid.

2. A buckle device according to claim 1, further comprising:
   (a) a biasing member urging said buckle locking means in a direction to secure the engagement between said lock receiving portion and said buckle lock means.

3. A buckle device according to claim 2, wherein said biasing member includes a spring coupled with said buckle arm.

4. A buckle device according to claim 1, wherein the portion of said engagement member is engageable with an engagement shaft provided in said back lid.

5. A water-proof camera comprising:
   (a) a lock receiving portion provided in said camera;
   (b) a back lid rotataly supported on said camera;
   (c) a buckle arm rotatably supported on said water-proof camera;
   (d) buckle locking means slidably supported on said buckle arm and arranged to slide between a first position to engage said lock receiving portion and a second position to be disengaged from said lock receiving portion at a point during the sliding movement, one end of said buckle locking means when in said second position serving as a handle; and
   (e) engagement member rotatably supported on said buckle arm and having a portion engageably with said back lid.

* * * * *